March 8, 1949.  E. L. MARTINIS  2,463,634
ANTISKIDDING APPLIANCE FOR AUTOMOBILES
Filed April 25, 1947  3 Sheets-Sheet 1

INVENTOR.
Ernest L. Martinis,
BY Victor J. Evans & Co.
ATTORNEYS

March 8, 1949. E. L. MARTINIS 2,463,634
ANTISKIDDING APPLIANCE FOR AUTOMOBILES
Filed April 25, 1947 3 Sheets-Sheet 2
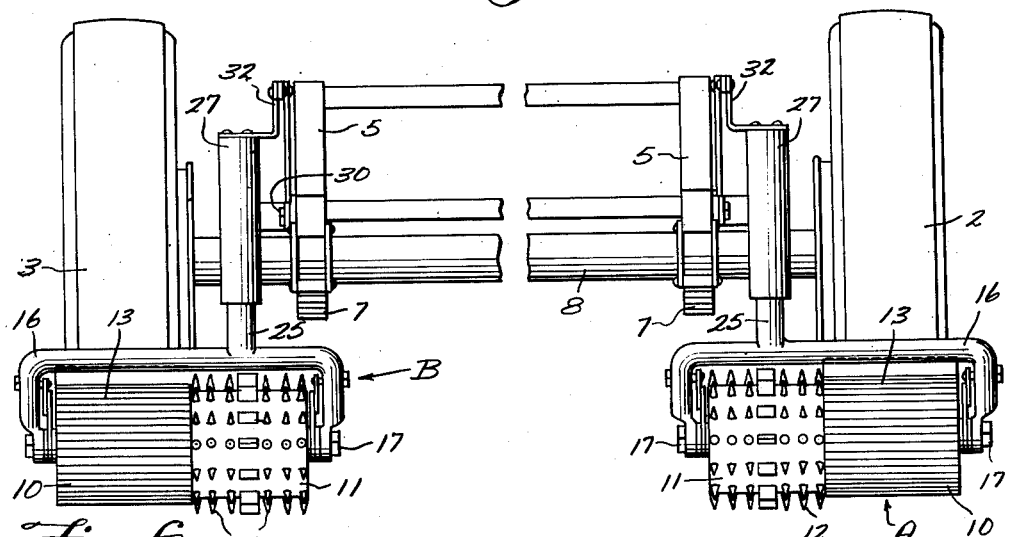
Fig. 3.
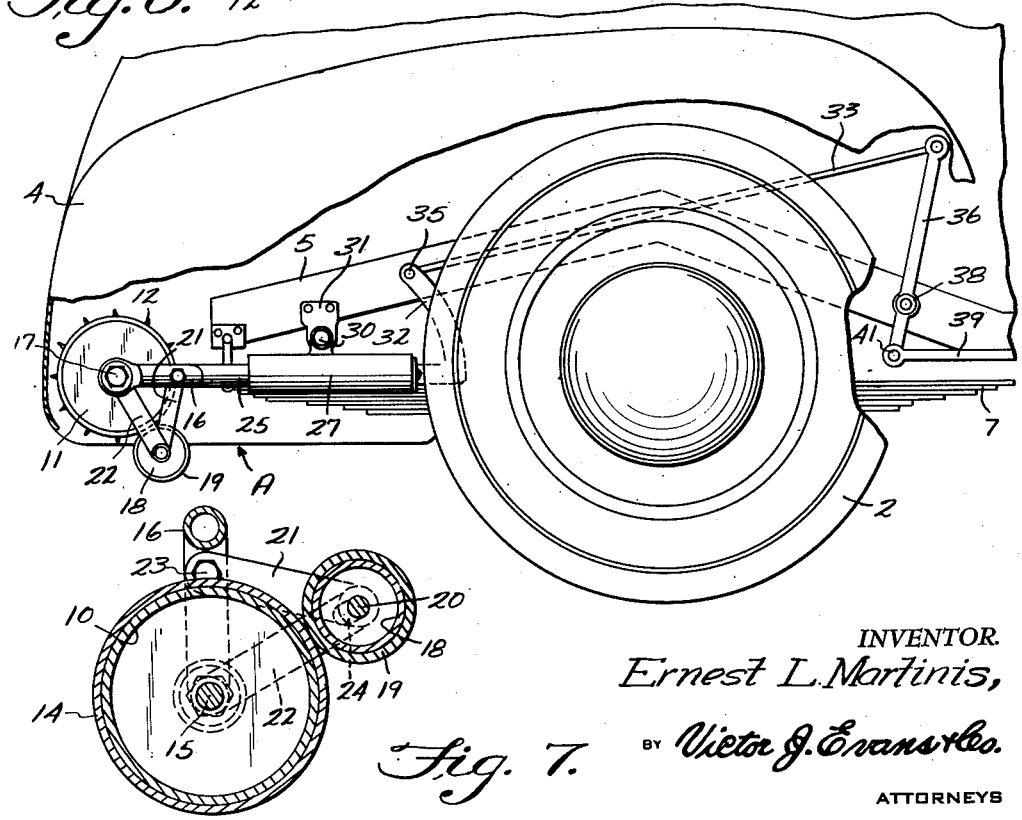
Fig. 6.
Fig. 7.
INVENTOR.
Ernest L. Martinis,
BY Victor J. Evans & Co.
ATTORNEYS March 8, 1949. E. L. MARTINIS 2,463,634
ANTISKIDDING APPLIANCE FOR AUTOMOBILES
Filed April 25, 1947 3 Sheets-Sheet 3
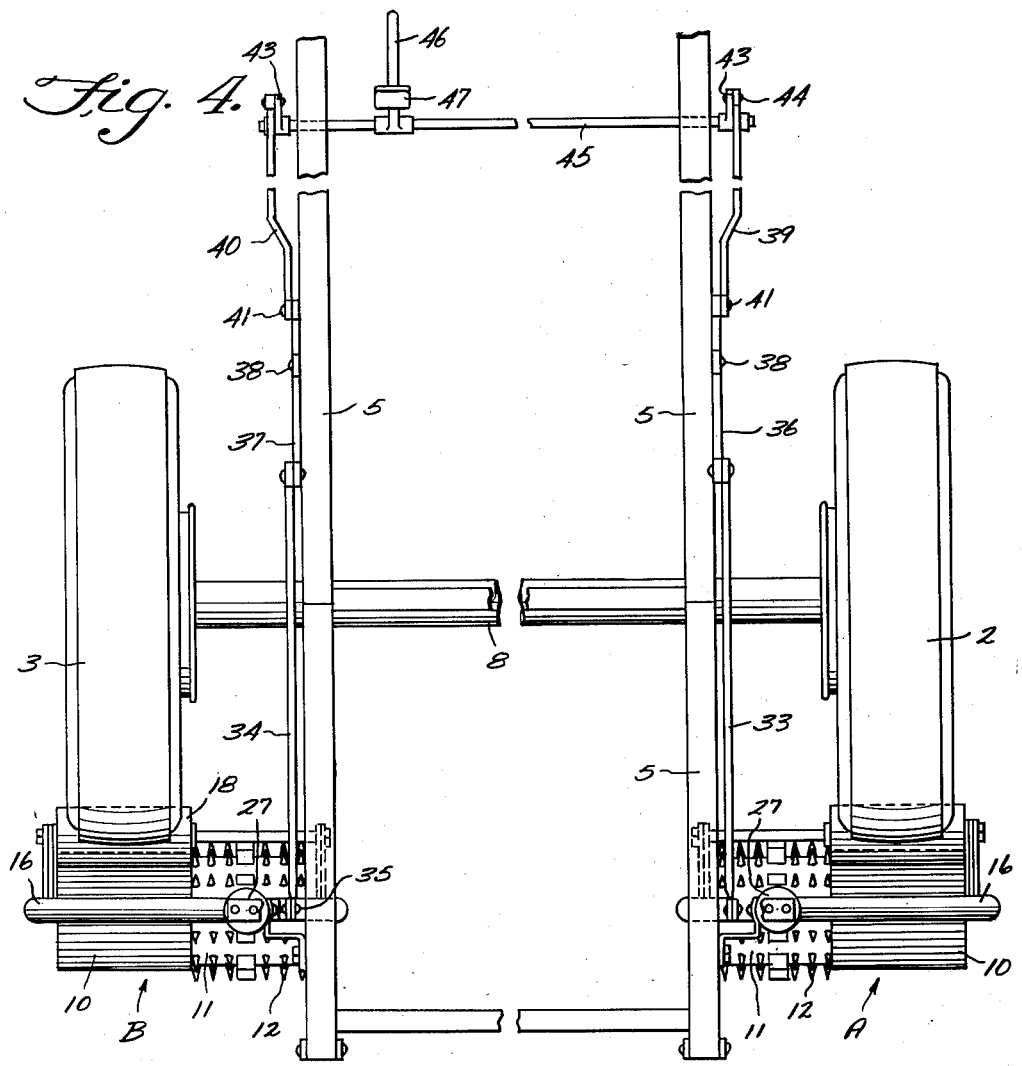
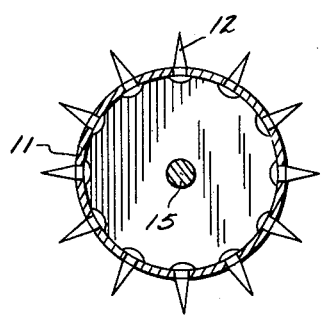
INVENTOR.
Ernest L. Martinis,
BY *Victor J. Evans & Co.*
ATTORNEYS Patented Mar. 8, 1949

2,463,634

UNITED STATES PATENT OFFICE 2,463,634

ANTISKIDDING APPLIANCE FOR AUTOMOBILES

Ernest L. Martinis, Southgate, Ky.

Application April 25, 1947, Serial No. 743,972

2 Claims. (Cl. 180—15)

The present invention relates generally to automotive vehicles, and more specifically to anti-skidding appliances for automobiles which are carried by the vehicle in normally inactive position, and under control of the driver of the vehicle to be shifted into active, ground-engaging position, for co-action with the rear wheels of the automobile, to prevent skidding or slipping of the vehicle.

Two unitary, non-skid appliances under a single pedal control, are provided for the rear wheels of the vehicle as additional traction means, and each unit includes traction and friction members operated by the rear wheel of the vehicle for extricating the vehicle from stalled condition on snow-covered ground, icy streets, and other slippery surfaces.

As an attachment for the automobile, the two units of the appliance are preferably housed within the rear wheel fenders of the vehicle, from where they may be dropped into active service when required, and after the performance of their functions the units may with facility be retracted to inactive positions and concealed within the fenders.

The invention consists in certain novel features of construction and combinations and arrangements of parts as will hereinafter be described and more specifically set forth in the appended claims.

In the accompanying drawings I have illustrated a complete example of a physical embodiment of my invention in which the parts are combined and arranged in accord with one mode I have so far devised for the practical application of the principles of the invention. It will however, be understood that changes and alterations are contemplated and, may be made in these exemplifying drawings and mechanical structures, within the scope of my claims, without departing from the principles of the invention.

Figure 3 is a rear elevation depicting a portion of the chassis of the vehicle and showing the relation of the two units, in active positions.

Figure 4 is a top plan view of the parts in Fig. 3.

Figure 5 is a transverse sectional view of one of the studded or spiked ground engaging rotors or rollers.

Figure 6 is a view similar to Fig. 2, showing a unit in uplifted or retracted position; and Figure 7 is a transverse sectional view through a ground-engaging or traction-roller and its friction roller for transferring or transmitting power and motion from the tire of a vehicle wheel.

Figure 1:
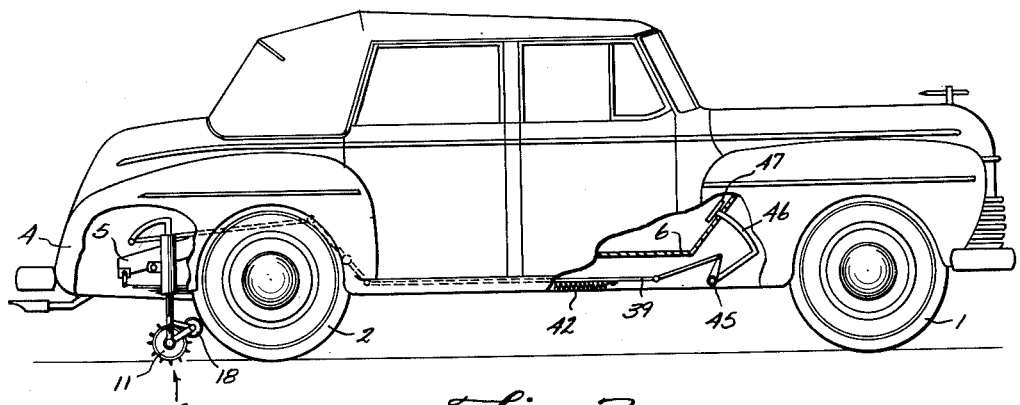
Figure 1 is a view in side elevation of a conventional automobile, which is partly broken away to disclose the operating parts and control, one of the units being seen in active ground-engaging position.

While the appliance of my invention is adapted for use as an attachment for various types of automotive vehicles as an aid in producing the required traction for propelling a vehicle, for convenience of description and illustration the drawings portray portions of a conventional automobile including the front wheels 1 and rear wheels 2 and 3, the latter within the fenders 4. The chassis or frame of the vehicle is designated 5, the front flooring or foot-board 6, the rear spring suspension as 7, and the rear axle is indentified as 8.

In the installation of the appliance each of the rear wheels 2 and 3 is equipped with a ground gripping unit, or added traction device that includes a rotor or roller that is revolved by pressure and friction from an adjoining vehicle wheel, or its tire, and these right-hand and left-hand units A and B in Figs. 3 and 4, are under control of a single pedal mechanism, for movement to and from active positions.

Inasmuch as the complementary units are of similar construction and operations, a detailed description of one unit will suffice for both of them. Each unit includes a combined pressure and friction-driven ground-roller 10 and a multi-studded or spiked traction roller 11, both of cylindrical shape, and the latter of less diameter to accommodate the studs or radial spikes 12; and the ground roller may have a smooth circumference as in Fig. 4, or its circumferential surface may be longitudinally serrated as at 13 in Fig. 6.

The ground roller 10 for contact with the road surface may be equipped with a resilient friction face or surface as 14 of rubber or other suitable material, and the radial studs or spikes may be rigidly attached or affixed to the cylinder 11 in appropriate manner.

Each roller 10—11 is journaled on a central axle 15, and the axle is mounted in the spaced ends of an inverted, somewhat U-shaped yoke 16, preferably of tubular metal, and secured by lock nuts 17, to provide a supporting frame for the roller.

These two roller units are adapted to be moved into operative relation with the two rear wheels 2 and 3, and they are revolved by the rotating wheels, or their tires, through pressure and friction, and the use of two transfer or intermediate friction rollers 18, 18, having suitable wear faces 19.

In operative positions these power-transferring rollers are located on a radial line passing from the center of the wheel and the ground roller, and through the centers of the power-transfer rollers 18 so that the revolving wheel-tires may transmit power and motion through the intermediate rollers to the ground rollers to turn the ground rollers in the same direction as the revolving vehicle tires.

Each intermediate power-transfer roller is journaled on an axle 20, and the axle is supported from a yoke 16 and axle 15 by means of a jointed frame including two pairs of angular arms 21, 22, the former being mounted at 23 on the yoke, and the latter arms 22 being mounted on the axle 15, within the yoke; and arms 22 are preferably slotted at 24 to insure an operative joint.

Each of the traction units is resiliently mounted on the chassis or frame of the automobile, and the supporting yoke for the unit is provided with a post or integral plunger 25 having an enlarged head 26 for automatic adjustment in a cylindrical casing or housing 27 formed with a bottom retaining flange 28 to confine the head within the housing; and a coiled spring 29 interposed between the closed end of the housing and the head tents to project the traction unit into ground engaging position.

Figure 2:
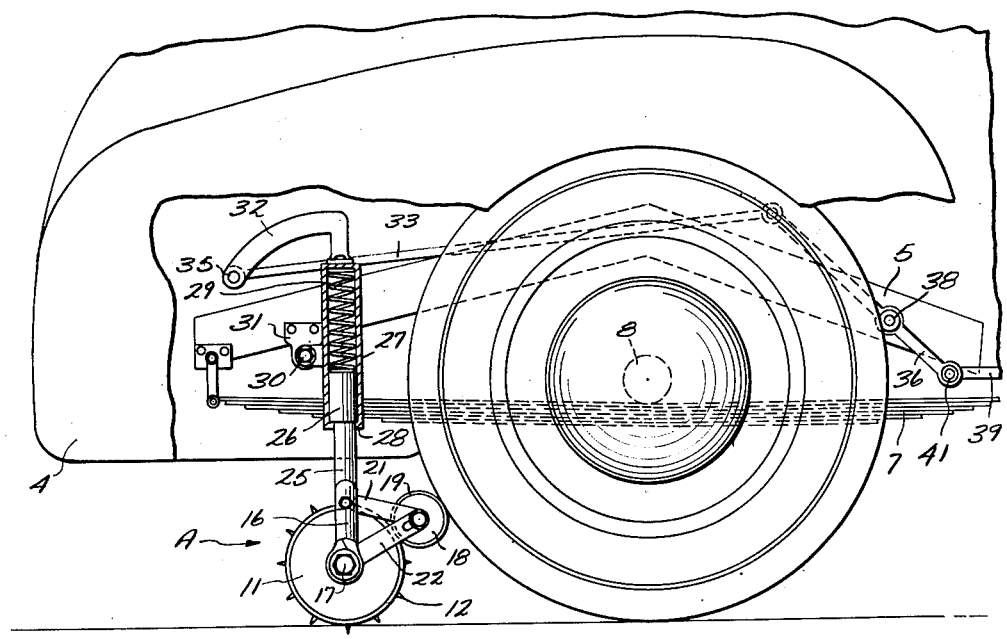
Figure 2 is an enlarged view partly in elevation at the right rear side of the vehicle, showing a unit in active position, and partly in section.

The housing is pivotally mounted upon a bolt 30, and the latter is supported by bracket 31 on the chassis 5 or other suitable member, in order that unit may swing from the horizontal inactive position in Fig. 6 to the vertical or upright active position of Figure 2, within the confines of the rear fender.

As indicated in Fig. 6 the weight of the unit is overbalanced when in horizontal or retracted position, and therefore gravity together with spring devices are utilized in swinging the unit to retracted position, while pedal actuated mechanism is employed for swinging the units into operative or active position.

The pedal controlled mechanism for the units includes a crank arm 32 of arcuate shape that is rigidly mounted on the closed end of the housing 27, and a pair of laterally spaced longitudinally extending connecting rods 33 and 34 are pivoted at 35 to these arms. The connecting rods extend toward the front of the vehicle along the chassis and at their front ends they are pivotally connected to two rock-levers 36 and 37 each of which is pivoted at 38 on the chassis.

A pair of draw links 39 and 40 are hinged at 41 to the rock levers, and springs 42 are anchored at their ends to the draw rods and to the chassis, and as best seen in Fig. 4 the front ends of the draw links 39 and 40 are pivoted to two rocker arms 43, 43, at 44. The rocker arms are rigidly mounted near the opposite ends of a rock shaft 45 that is journaled in bearings beneath the foot board 6 of the automobile, and a pedal crank 46 is rigidly attached to the rock shaft and provided with a pedal 47. The pedal crank extends through a suitable slot in the footboard and the pedal is located in convenient position for access by the foot of the driver of the car or automobile for swinging the traction units into operating or active position. Suitable quick-detachable means are employed for retaining the traction units in retracted position, and when these means are released, the units are swung to active position by depressing the pedal for co-action with the vehicle wheels; and after serving their purpose the units of the appliance are retracted upwardly into their enclosing fenders by means of the springs 42 and the overbalancing of the unit due to its weight and the pull of gravity.

Having thus fully described my invention, what I claim as new and desire to secure by Letters Patent is:

1. In an added traction unit adapted for frictional coaction with a vehicle wheel, the combination with a housing pivotally supported on the vehicle and having an arcuate shaped crank arm fixed to one end thereof, a post slidably mounted in the housing having a resilient support in the housing engaging one end thereof and an inverted U-shaped yoke integral with the opposite end thereof, of a combined ground engaging roller and a multi-studied traction roller forming an extension of the ground engaging roller journaled in the yoke, a supporting frame mounted on said yoke, a power transfer roller mounted in the frame for frictional engagement with the ground engaging roller, linkage including a rocker arm connected to said crank arm and a pedal connected to said linkage for moving said yoke whereby said first mentioned rollers are brought into engagement with the ground and the power transfer roller is brought into engagement with the vehicle wheel to cause rotation of said first rollers.

2. In an added traction unit as in claim 1 wherein spring means is connected to said linkage to retract said yoke when pressure has been released on said pedal.

ERNEST L. MARTINIS.

REFERENCES CITED

The following references are of record in the file of this patent:

UNITED STATES PATENTS

| Number | Name | Date |
|---|---|---|
| 271,129 | Rowe | Jan. 23, 1883 |
| 1,273,684 | Small | July 23, 1918 |
| 1,497,327 | Childers | June 10, 1924 |
| 1,889,241 | Gibson et al. | Nov. 29, 1932 |
| 1,926,140 | Coyan | Sept. 12, 1933 |
| 2,112,781 | Lisov | Mar. 29, 1938 |
| 2,260,468 | Lewis | Oct. 28, 1941 |